UNITED STATES PATENT OFFICE.

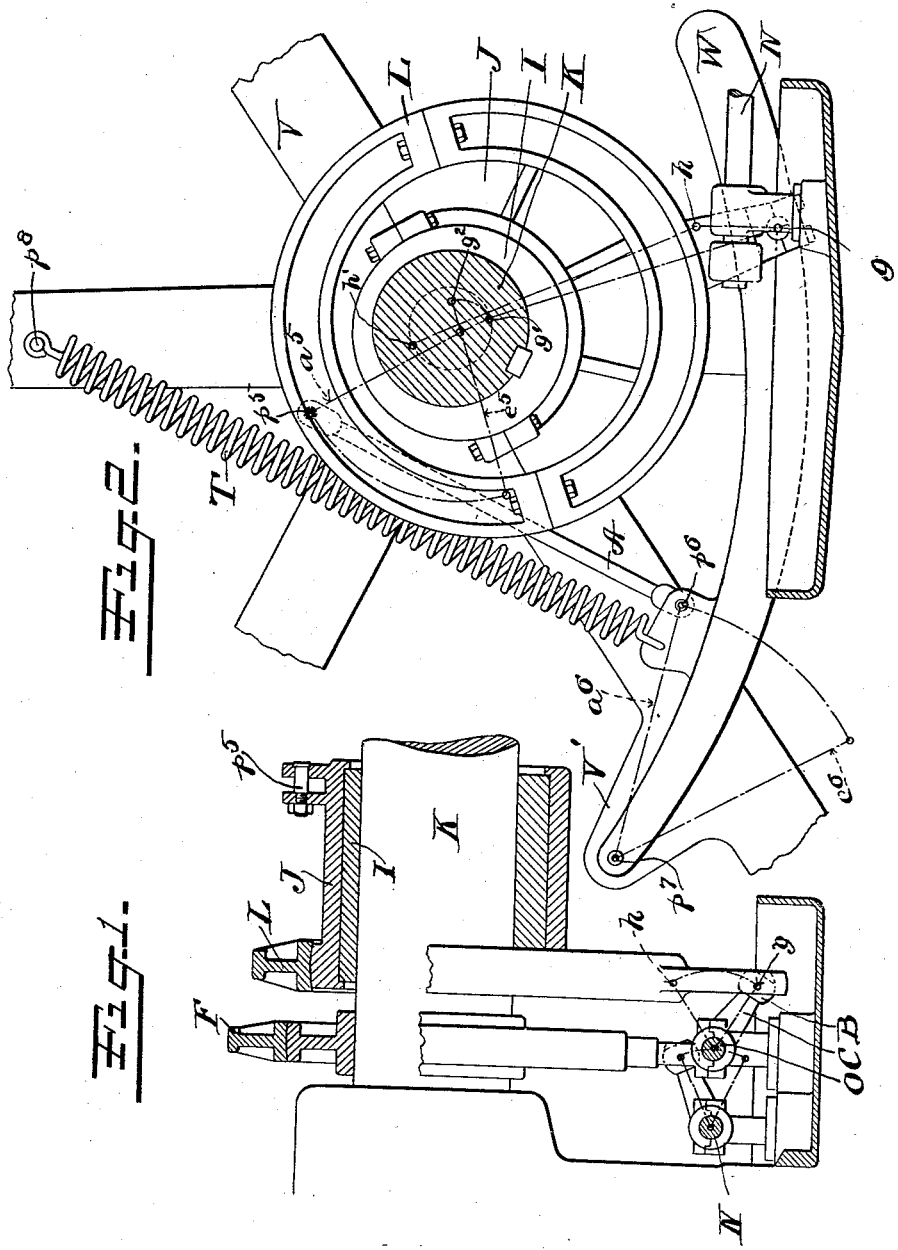

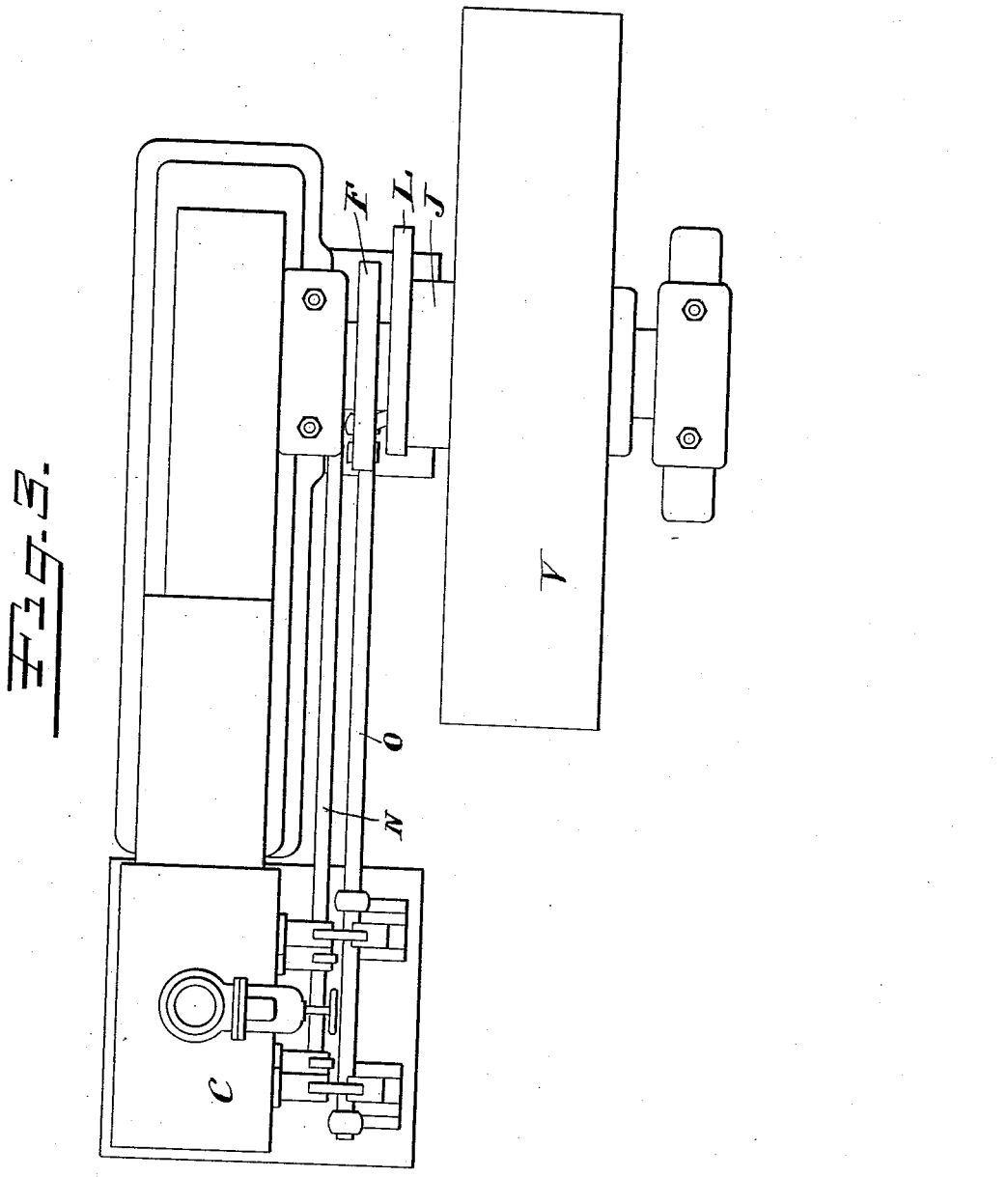

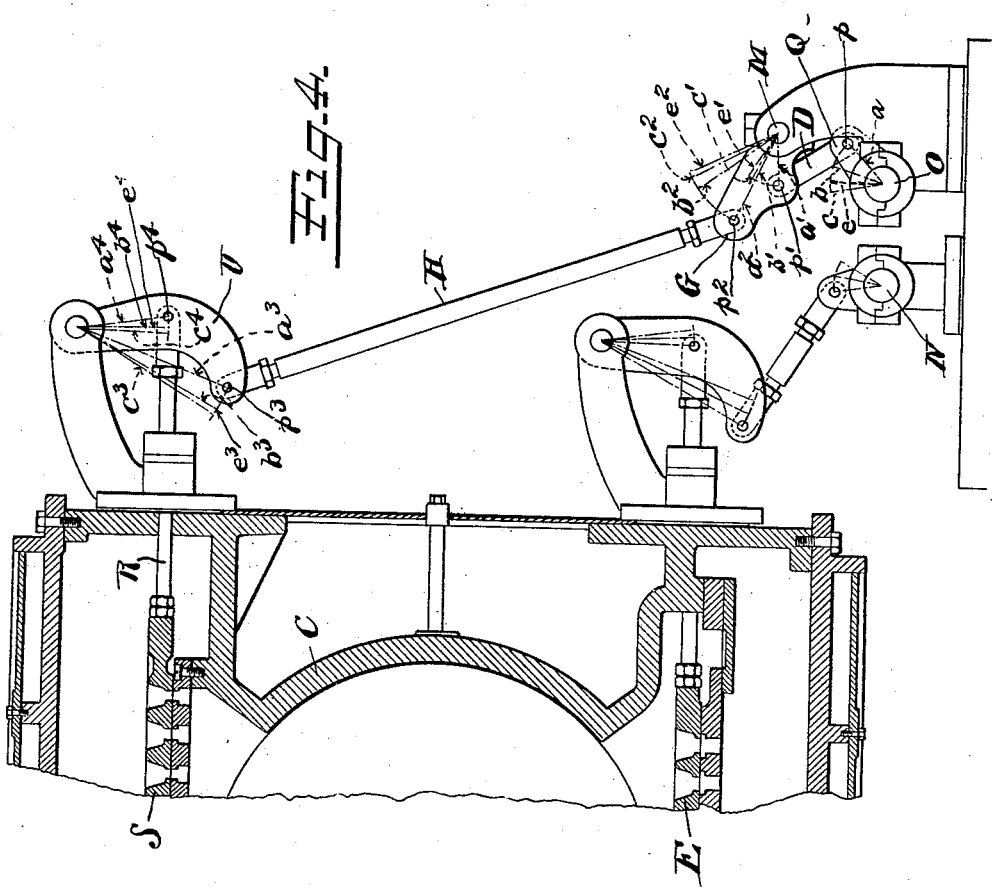

JAMES ALWARD SEYMOUR, OF AUBURN, NEW YORK.

VALVE-GEAR.

1,111,327.  Specification of Letters Patent.  Patented Sept. 22, 1914.

Application filed May 28, 1913. Serial No. 770,300.

*To all whom it may concern:*

Be it known that I, JAMES ALWARD SEYMOUR, a citizen of the United States, residing at Auburn, Cayuga county, New York, have invented certain new and useful Improvements in Valve-Gear, of which the following is a full, clear, and exact description.

This invention relates to improvements in the operating mechanism of flat gridiron valves such as applied to the cylinders of steam engines of the general class described in my prior Patent No. 628,121, dated July 4, 1899, and consists in certain novel arrangements and combinations of the valve-actuating mechanisms whereby the movement imparted to the valves without the use of cams by the motion of the eccentric, or other actuating device, by means of connecting devices interposed between said actuating device and the said valves, is distorted and made irregular. One of the main differences between the present invention and that shown in said patent is that in said patent a six valve cylinder is used having at each end of the cylinder one exhaust valve and port, and one main steam valve and port, both of these valves being driven by a fixed eccentric, and superimposed upon the main steam valve, an auxiliary cut-off valve driven by an eccentric under control of a governor. In the present invention the cylinder has four valves with one exhaust valve and port and one steam valve and port at each end of the cylinder, and the exhaust valves are driven by mechanism entirely separate from that driving the steam valves, which latter are driven by the governor eccentric as hereinafter described. One object of the distortion and irregularity of the speed of movement of the valves referred to is to give the valves such travel as shall be necessary to secure adequate port opening and a sufficient seal when closed, and to suppress further unnecessary valve motion such as usually takes place after the closing of the valve, by having a pause, or dwell, occur in the motion of the valve at one end of the stroke. At this time an unbalanced valve is under considerable steam pressure, producing proportionate friction, and it is especially important with valves of the gridiron type to reduce the unnecessary valve motion when closed as above referred to in order to secure an excess in width of valve grid over that of its corresponding port, not materially greater than that necessary to afford a proper seal at both edges of the port when closed. It is evident that if there is an excessive movement of the valve when closed, the width of the valve grid must be correspondingly increased as compared with the width of the port in order to prevent opening up of the port on the side opposite that at which closing takes place. Under ordinary conditions, if the regular motion of the eccentric were imparted to a gridiron steam valve of sufficient magnitude to secure proper port opening, the motion, while the valve was closed, would be so great and the corresponding width of valve grid would be so greatly increased, that the size of the valve and valve seat would be increased to what would be a prohibitive amount, having in view economical proportions of the engine from a constructive standpoint, and also the keeping of the total volume of the port from valve to cylinder down to a reasonable amount. This port volume constitutes a part of the waste, or so-called "clearance space" of the cylinder, which it is desirable to keep as small as possible to secure economy in steam consumption. A pause, or dwell, in the motion of the valve as above described is accomplished by putting in the valve mechanism what is commonly known as a "wrist plate" effect, consisting of a driving rocker having a reciprocating or rocking movement, connected with suitable pins by a link to a driven rocker or slide also having a reciprocating movement, the motion of the pin in the driving rocker to which the said connecting link is attached being inclined or unsymmetrical with reference to the position of the pin in driven rocker or slide to which the connecting link is also attached.

A single wrist plate motion interposed in the valve driving mechanism will give a sufficient dwell or pause motion for a gridiron exhaust valve, which should be open about one-half of a revolution, and the combination of such a wrist plate mechanism with such an exhaust valve is not novel. With a gridiron steam valve controlling both the admission and the cut-off of the steam, the case is different in that one wrist plate effect will not give sufficient dwell, the period of opening of the steam valve for the latest cut-off being usually less than three-eighths of a revolution, and under usual working conditions much less than this proportion. This means that a much greater proportional amount of the regular eccentric motion must be suppressed than is necessary for the exhaust valve, in order to avoid unnecessary valve motion when closed, and consequent excessive width of port grid, and it requires the placing of two or more wrist plate effects in series between the steam valve and its actuating device, which is an eccentric under the control of a shaft governor. This governor regulates the speed of the engine by varying the timing and stroking of the eccentric in such a way as to give the proper cut-off necessary to develop the required amount of power at all times with an approximately constant point of admission of steam to the cylinder at the beginning of the stroke of the piston.

It is also desirable to distort the motion of the governor eccentric as imparted to the steam valves in such a way as to counteract the effect of the angularity of the connecting rod upon the motion of the piston. Otherwise a difference will exist between the cut-offs at the two ends of the cylinder at most loads. This defect cannot be corrected for all loads by making the steam valve admissions dissimilar at the two ends of the cylinder. This last mentioned method for securing equal cut-offs at both ends of the cylinder is objectionable and more or less ineffective with positively driven valves, especially when of the grid-iron type described herein.

In the accompanying drawings, Figure 1 is an elevation showing a partial section of the frame end valve gear. Fig. 2 is an elevation showing the frame end steam valve driving mechanism, a shaft governor, and certain associated parts. Fig. 3 is a top plan view of the engine conventionally shown. Fig. 4 is an end elevation, partly in section, of the valves and valve gear at one end of the cylinder.

The governor, as shown, consists of a centrifugal weight W, pivoted to an arm V' of the flywheel V by a pin $p^7$, said weight having its centrifugal force opposed by the spiral spring T attached to an arm of the flywheel V by a pin $p^8$. The weight W is also connected by a link A through pin $p^6$ on the governor weight to pin $p^5$ on the governor eccentric J. This eccentric is extended in sleeve form to give a suitable bearing upon the fixed eccentric boss I, which is keyed fixedly to the shaft K. When the centrifugal weight W moves from its inner position, in which it is shown, to its outermost position, the center of pin $p^6$ will move from the angle $a^6$ toward angle $e^6$. At the same time the pin $p^5$ will move from the angle $a^5$ toward the angle $e^5$ by reason of the connecting link A causing the governor eccentric J to turn upon the fixed eccentric boss I so that the center of the governor eccentric will move from the angle $g'$ toward angle $g^2$, representing the positions of maximum and minimum cut-off respectively.

The eccentric strap L drives with universal connections at both ends from the eccentric J upon the ball pin B on the rocker C situated upon the steam valve lay shaft O. It will be noted that the points $g$ and $h$, representing the lower and upper positions of the center of the ball pin B respectively, correspond to the angle points $g'$ and $h'$ of the center of the governor eccentric, and that the line of motion of the center $g$ of this pin B in a plane at right angles to the axis of the shaft does not pass through the center of the shaft. Therefore, the motion of the eccentric as received by the pin B is distorted inasmuch as the extreme positions of the center of pin B, i. e. points $g$ and $h$, correspond to the positions of the center of the eccentric $g'$ and $h'$, which latter are not opposite to each other. Furthermore, there is a further distortion due to the angularity of the eccentric strap connection L from the eccentric J to the pin B.

The proportions of the respective positions and strokes are so made that the desired correction is obtained in the motion of the lay shaft or rock shaft O to counteract the effect upon the position of the piston of the angularity of the connecting rod, and equal cut-offs at both ends of the cylinder are secured at all loads.

Fig. 3 shows in a general way the location of the flywheel V which contains the governor, the governor eccentric sleeve J, the steam valve eccentric strap L, and the exhaust valve eccentric strap F, driving respectively the steam valve lay shaft O and the exhaust valve lay shaft N which lead back, as shown, to the cylinder valve gear situated by the side of the cylinder C.

In Fig. 4, C is the cylinder, E the exhaust valve driven from the rock shaft N (or so-called exhaust valve lay shaft) through the connecting gear as shown. The rock shaft O is the steam valve lay shaft. The rocker arm Q on the lay shaft O drives, by means of the link D through the pins $p$ and $p'$ the rocker G journaled on the pivot M.

It will be noted that the angle lines $a$ and $c$, representing the extremes of motion of the center of the pin $p$, and angle line $b$ representing the middle point of such motion, correspond to the positions of the pin $p'$ indicated by the position of angle lines $a'$, $c'$ and $b'$, respectively, showing that the motion from $b$ to $c$, represented by the angle lines $b'$ and $c'$, has been much lessened in rocker G, while the motion from $a$ to $b$, represented by the angle $a'-b'$, is substantially undiminished. It will also be noted that the center of the pin $p'$ reaches its extreme upper position (denoted by angle line $e'$) when the center of the pin $p$ is in a direct line between the center of the shaft O and pin $p'$, this position of the pin $p$ being denoted by angle line $e$. The point $c'$ ceases to become the extreme of motion of the center of the pin $p'$, although the corresponding angle line $c$ of the center of the pin $p$ is the point of extreme motion of this latter pin. It is evident that the center of the pin $p'$ will make a small stroke from the point $e'$ to $c'$, and back again to $e'$ while the center of the pin $p$ is passing from point $e$ to point $c$ and back again to point $e$; also, that the velocity of the pin $p'$ as compared with the velocity of the pin $p$ becomes diminished as the center of the pin $p'$ approaches the point $e'$ in either direction, and that the instantaneous velocity of the center of pin $p'$ at the point $e'$ is zero. From the foregoing it is readily seen that the rocker arm Q, the link D and the rocker arm G form the "driving rocker," the "connecting link," and the "driven rocker" of a wrist plate effect.

The rocker G contains in addition to the pin $p'$ the pin $p^2$ driving through the link H to pin $p^3$ on the lever U, the steam valve S being directly driven from this lever U through the valve rod R and the pin $p^4$. It will be noted that the rocker G, the link H, and the lever U form the "driving rocker," the "connecting link" and the "driven rocker" of a second wrist plate effect.

It will be noted that angle lines $a^2$, $b^2$, $c^2$ and $e^2$ represent the same positions of the rocker arm G in angular motion as the angle lines $a'$, $b'$, $c'$ and $e'$; and that the angle lines $a^3$, $b^3$ and $c^3$ (or $a^4$, $b^4$ and $c^4$, which represent the same positions in angular motion of the lever U) correspond to the angle lines $a'$, $b'$ and $c'$ of the motion of the rocker G, and hence to angle lines $a$, $b$, and $c$ respectively of the motion of the lay shaft O. In other words, by means of the second wrist plate effect the point $b^3$ has been moved still farther toward the point $e^3$, and one-half of the original motion substantially suppressed.

It will be understood that I have described in detail only one steam valve with its corresponding branch train of wrist plate motions, the same being shown in Fig. 4, and that the other steam valve is provided with a similar branch train from the train of mechanism connecting with the governed eccentric.

What I claim is:

1. In a steam engine, the combination of a pair of gridiron valves for controlling the admission and cutting off of the steam, a shaft governor controlling the speed of the engine by varying the position of the eccentric used to actuate said pair of valves, a connecting train of mechanism for conveying the motion of said eccentric with branches to each valve, and in each branch a pair of wrist plate motions in series; each wrist plate motion consisting of a driving rocker, a connecting link, and a driven rocker turning upon a fixed stationary shaft or pivot; the driven rocker of the wrist plate motion which is nearer the eccentric and the driving rocker of the wrist plate motion which is nearer the valve being rigidly connected together and pivoted upon said fixed shaft.

2. In a steam engine, the combination of a pair of gridiron valves for controlling the admission and cutting off of the steam, a shaft governor controlling the speed of the engine by varying the position of the eccentric used to actuate said pair of valves, a connecting train of mechanism for conveying the motion of said eccentric including a rocker pin deriving motion from said eccentric, which motion is in a path which, if extended, will pass at some distance from the center of the main shaft upon which the eccentric is situated, said pin being so placed as to distort its motion as received from the eccentric substantially as described; and said connecting train also including branches to each valve and in each branch a pair of wrist plate motions in series; each wrist plate motion consisting of a driving rocker, a connecting link and a driven rocker turning upon a fixed stationary shaft or pivot; the driven rocker of the wrist plate motion which is nearer the eccentric and the driving rocker of the wrist plate motion which is nearer the valve being rigidly connected together and pivoted upon said fixed shaft.

JAMES ALWARD SEYMOUR.

Witnesses:
E. E. MORSE,
IDA M. HUNZIKER.